(No Model.)
T. McMASTER.
VEHICLE POLE.
No. 462,058.  Patented Oct. 27, 1891.
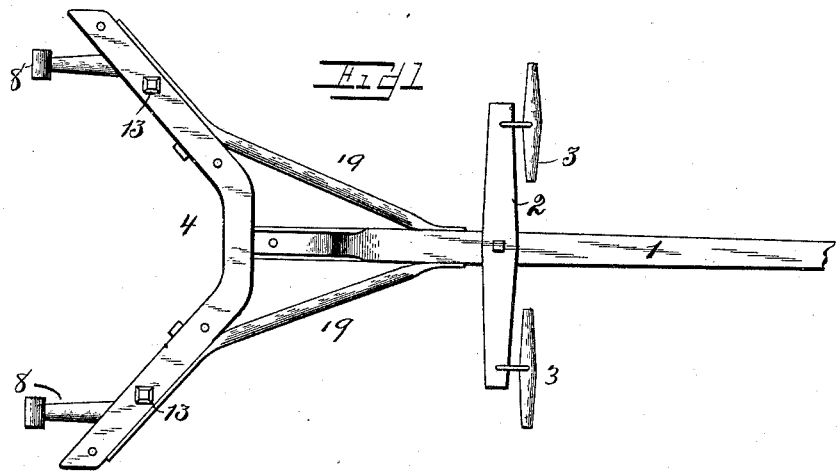
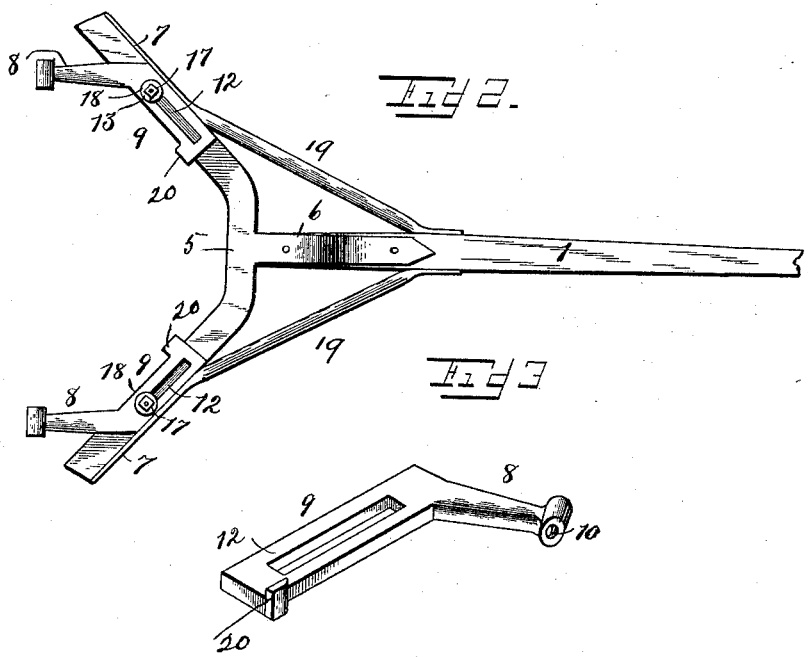
WITNESSES:
F. L. Ourand
H. L. Coombs
INVENTOR:
Theodore McMaster
by James Dagger & Co.
Attorneys.

UNITED STATES PATENT OFFICE.

THEODORE McMASTER, OF CENTRAL BRIDGE, NEW YORK.

VEHICLE-POLE.

SPECIFICATION forming part of Letters Patent No. 462,058, dated October 27, 1891.

Application filed April 22, 1891. Serial No. 389,945. (No model.)

*To all whom it may concern:*

Be it known that I, THEODORE MCMASTER, a citizen of the United States, and a resident of Central Bridge, in the county of Schoharie and State of New York, have invented certain new and useful Improvements in Vehicle-Poles; and I do hereby declare that the following is a full, clear, and exact description of the invention, which will enable others skilled in the art to which it appertains to make and use the same, reference being had to the accompanying drawings, which form a part of this specification.

My invention relates to improvements in what are known as "shiftable poles for vehicles"—that is to say, poles which can be applied to or used in connection with either wagons or sleighs or with vehicles of different widths.

I am aware that shiftable wagon-poles in themselves are not new, as such have long been known and used to a limited extent. They have not, however, been introduced into general use, owing to inherent defects, the principal objection being that in changing or shifting from a wagon to a cutter or sleigh the horses are thrown to far away from the latter.

The object of the present invention is to provide an improved construction of vehicle-pole and devices for connecting it with a wagon or other vehicle, whereby the above and other defects are remedied.

The invention consists in the novel construction and combination of parts hereinafter fully described, and specifically pointed out in the claim.

In the accompanying drawings, Figure 1 is a plan view of a wagon-pole constructed in accordance with my invention. Fig. 2 is a similar view looking from the under side. Fig. 3 is a detail view of one of the coupling-irons.

In the said drawings, the reference-numeral 1 denotes the pole or tongue provided with a whiffletree 2 and singletrees 3. At its rear end the pole is connected with a curved cross-bar 4, provided on its under side with a correspondingly-shaped metal plate or bar 5, having a central forwardly-extending arm 6, by which it is secured to the pole by spikes, bolts or other means. Brace-rods 19, provided with downwardly-projecting flanges 7, are connected with or secured to the tongue and cross-bar, which form ways or guides for the coupling-irons by which the pole is connected with a vehicle. As will be seen, these irons are bent at their centers, forming two arms 8 and 9 at an obtuse angle to each other. The arms 8 are formed at their ends with eyes 10, by which they may be clipped to a wagon-axle or to a sleigh or cutter. The arms 9, which abut against the flanges 7, are formed with slots 12, in which work bolts 13, having their ends screw-threaded to receive nuts 17. These bolts pass through apertures in the cross-bar 4 and plate 5, and washers 18 may be interposed between the nuts and arms. The inner ends of the arms 9 are provided with upwardly-projecting lugs 20, which rest against the rear edge of the cross-bar.

The operation will be readily understood. In changing the pole from a wagon to a cutter the nuts 17 are loosened and the coupling-irons adjusted or moved toward the center of the cross-bar, the nuts again tightened, and the irons connected with the vehicle. By this means the horses are brought nearer to the cutter, obviating the objections to prior constructions of shiftable poles. By a reverse operation the coupling-irons can be extended outward, thus allowing the device to be used with the widest wagons made or with the narrowest cutters.

Having thus described my invention, what I claim is—

The combination, with a vehicle-pole having a curved metallic bar secured to its rear end, of the angularly-bent adjustable coupling-irons provided with slots and eyes and with upwardly-projecting lugs at their inner ends, the bolts working in said slots and passing through the cross-plate, and the brace-bars having downwardly-depending flanges connected with the cross-bar and pole, substantially as described.

In testimony that I claim the foregoing as my own I have hereunto affixed my signature in presence of two witnesses.

THEODORE McMASTER.

Witnesses:
JOHN H. HOUCK,
JAMES L. LUCKEY.